United States Patent Office.

GUSTAV ROTHE, OF JERSEY CITY, ASSIGNOR OF ONE-HALF TO JULES LOUIS TOURNADE, OF WEST HOBOKEN, NEW JERSEY.

METHOD OF PRESERVING MILK.

SPECIFICATION forming part of Letters Patent No. 248,797, dated October 25, 1881.

Application filed September 21, 1880. (Specimens.)

*To all whom it may concern:*

Be it known that I, GUSTAV ROTHE, of Jersey City, in the county of Hudson and State of New Jersey, have invented a new and useful Improvement in the Art of Preserving Milk, of which the following is a specification.

The invention relates to a process of preserving milk, as hereinafter fully described.

The object of the invention is to reduce by a novel process cows' milk to a powdered form, in which condition it will possess all of its original elements. It may be preserved an indefinite length of time, and is capable of being restored to its normal state at any time by the addition of a liquid.

To carry my invention into effect I take any suitable quantity of milk—say one quart, for purposes of illustration—and heat it by a water bath or otherwise not quite to the boiling-point. Then add while it is warm (drop by drop) lactic acid until the caseine and cream of the milk are precipitated, forming in the lower portion of the vessel a thick rich clabber. I then decant the serum or whey supernatant on the clabber and evaporate it by any suitable means to a dry cheesy condition, when it will be powdered. While the serum is being thus treated the precipitate or clabber in a separate vessel is warmed, by a water bath or otherwise, sufficiently to melt it, and to it is added a little bicarbonate of soda, ten to fifteen grains, or as much as may be required to neutralize the free lactic acid in the precipitate. To this is then added the powder formed from the serum, as above described, and the whole thoroughly agitated and warmed until the mass is dry enough to powder. This powder will contain all of the elements of pure cows' milk, and may be restored to its original fluid condition by dissolving it in an appropriate quantity of warm water. The powder readily dissolves, and the thickness of the milk may be regulated at will by the amount of the water employed to restore it.

The degree of heat and the quantities of lactic acid and bicarbonate of soda required will vary according to the nature and condition of the milk treated; but it is believed that the above description will be sufficient to enable any one skilled in the art to practice the process. The milk reduced to the powdered form aforesaid may be packed in cans or other receptacles for the market, and will keep for an indefinite length of time in any climate.

What I claim as my invention, and desire to secure by Letters Patent, is—

The process of preserving milk and reducing it to a dry powdered form, which consists in first precipitating by the addition of lactic acid the caseine and cream; second, removing the surpernatant elements and evaporating them in a separate vessel to form a powder; third, melting by heat the caseine and cream (said precipitate) and neutralizing any free lactic acid contained in it by the addition of bicarbonate of soda; and, fourth, adding said powder formed from the supernatant elements to the said precipitate and combining and drying the two together, thus forming one powder containing all of the nutritive elements of pure cows' milk, substantially as set forth.

In testimony that I claim the foregoing improvement in the art of preserving milk, as above described, I have hereunto set my hand this 16th day of September, 1880.

GUSTAV ROTHE.

Witnesses:
JULES L. TOURNADE,
CHAS. C. GILL.